United States Patent [19]

Harada et al.

[11] Patent Number: 4,869,944

[45] Date of Patent: Sep. 26, 1989

[54] CORDIERITE HONEYCOMB-STRUCTURAL BODY AND A METHOD FOR PRODUCING THE SAME

[75] Inventors: Takashi Harada, Nagoya; Toshiyuki Hamanaka, Suzuka; Kunikazu Hamaguchi, Nagoya; Seiichi Asami, Okazaki, all of Japan

[73] Assignee: NGK Insulators, Ltd., Nagoya, Japan

[21] Appl. No.: 151,995

[22] Filed: Feb. 3, 1988

[30] Foreign Application Priority Data

| Feb. 12, 1987 | [JP] | Japan | 62-28364 |
| Feb. 12, 1987 | [JP] | Japan | 62-28366 |
| Nov. 11, 1987 | [JP] | Japan | 62-283127 |
| Nov. 11, 1987 | [JP] | Japan | 62-283128 |

[51] Int. Cl.$^4$ ............................................. B32B 3/12
[52] U.S. Cl. ................................... 428/116; 55/523; 156/89; 428/188; 502/527
[58] Field of Search .................. 55/523; 156/89; 502/527; 428/116, 188, 332, 118

[56] References Cited

U.S. PATENT DOCUMENTS

| 3,885,977 | 5/1975 | Lachman et al. | 501/80 |
| 3,950,175 | 4/1976 | Lachman et al. | 501/118 X |
| 3,958,058 | 5/1976 | Elmer | 428/220 |
| 4,177,307 | 12/1979 | Torii et al. | 428/116 |
| 4,268,311 | 5/1981 | VerDow | 501/141 |
| 4,280,845 | 7/1981 | Matsuhisa et al. | 264/66 X |
| 4,295,892 | 10/1981 | Matsuhisa et al. | 501/120 |
| 4,435,512 | 3/1984 | Ito et al. | 501/153 X |
| 4,489,774 | 12/1984 | Ogawa et al. | 428/116 X |
| 4,495,300 | 1/1985 | Sano | 501/107 X |
| 4,540,671 | 9/1985 | Kondo et al. | 264/60 X |
| 4,772,580 | 9/1988 | Hamanaka et al. | 502/439 |

Primary Examiner—Henry F. Epstein
Attorney, Agent, or Firm—Arnold, White & Durkee

[57] ABSTRACT

A cordierite honeycomb structural body to be used as a catalyst carrier, having excellent heat resistance, thermal shock resistance and coatability with a high specific surface area material and a catalyst is disclosed, which have a chemical composition consisting mainly of 42–56% by weight $SiO_2$, 30–45% by weight of $Al_2O_3$ and 12–16% by weight of MgO, having a crystal phase consisting mainly of cordierite, and having coefficients of thermal expansion of not higher than $0.3 \times 10^{-6}/°C$. in the flow-passage direction of the honeycomb structure and not higher than $0.5 \times 10^{-6}/°C$. in a direction perpendicular to the flow-passage of the honeycomb structure within the temperature range of 40°–800° C. A cordierite honeycomb-structural body, wherein a distribution of diameters of pores, relative to a total volume of pores having a diameter of 0.5–5 $\mu$m is not less than 40% and the total volume of pores having a diameter of not smaller than 10 $\mu$m is not more than 30% based on the total pore volume in the body. The body has excellent coatability and thermal shock resistance after coating.

14 Claims, 11 Drawing Sheets

FIG_1

FIG_2

FIG_3

FIG_5
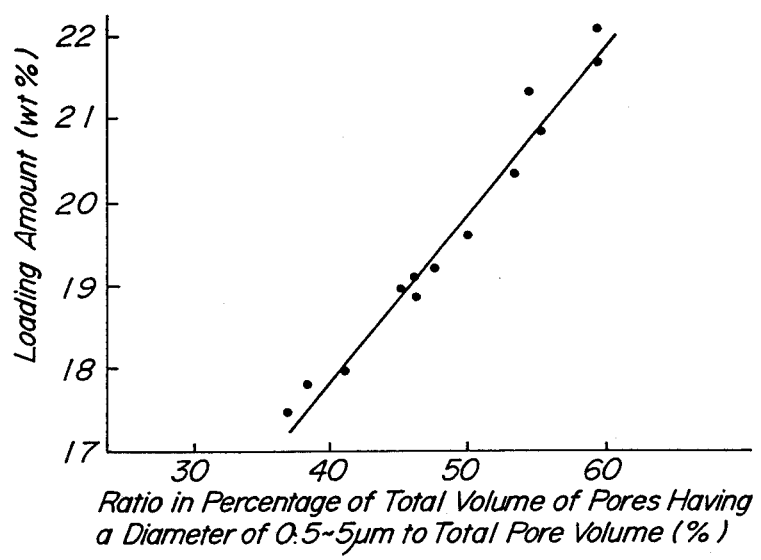
Ratio in Percentage of Total Volume of Pores Having a Diameter of 0.5~5μm to Total Pore Volume (%)
FIG_6
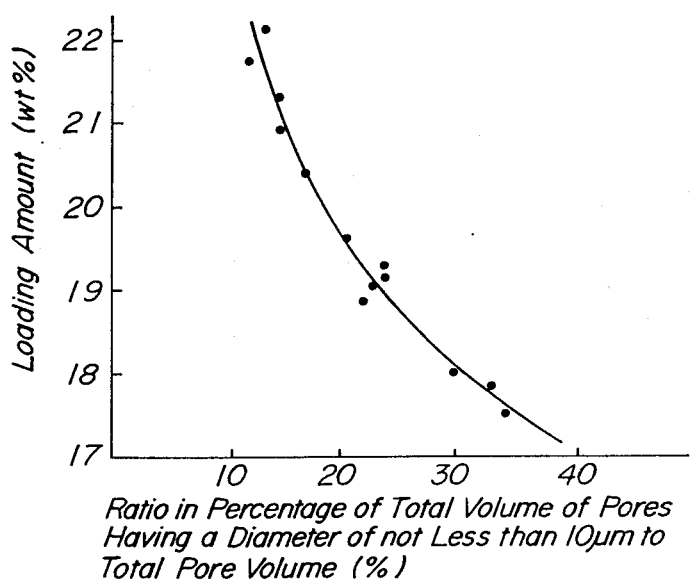
Ratio in Percentage of Total Volume of Pores Having a Diameter of not Less than 10μm to Total Pore Volume (%)

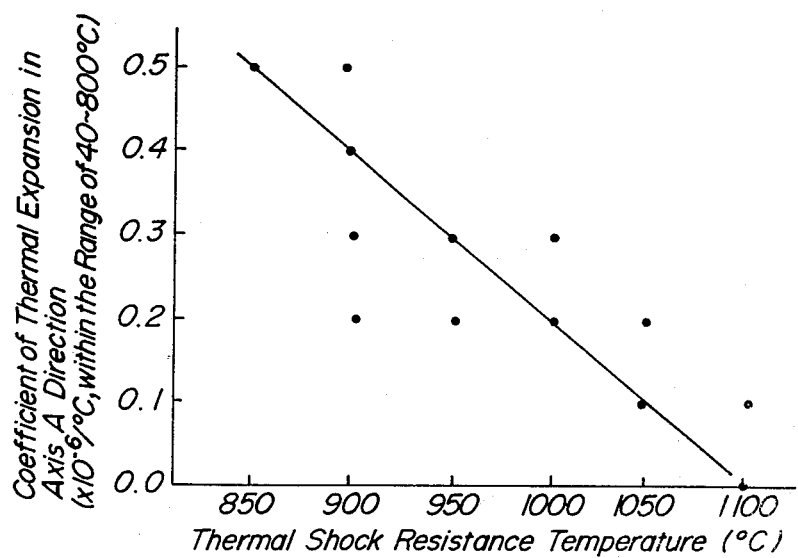
FIG_7
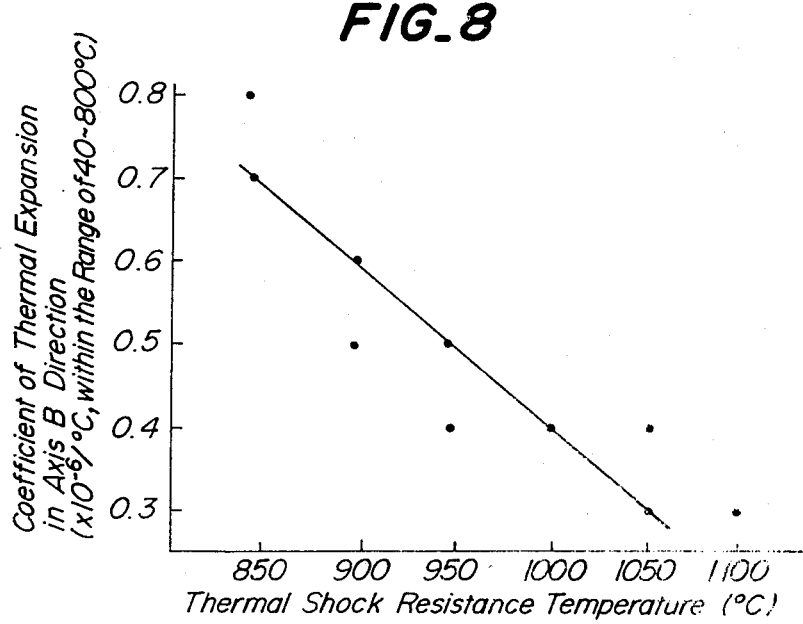
FIG_8

FIG_9a
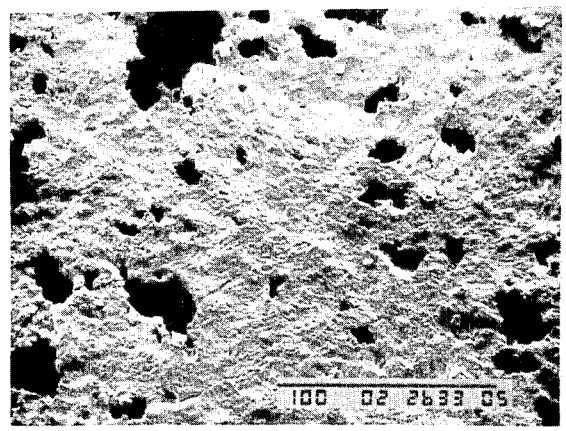
FIG_9b

FIG_10a
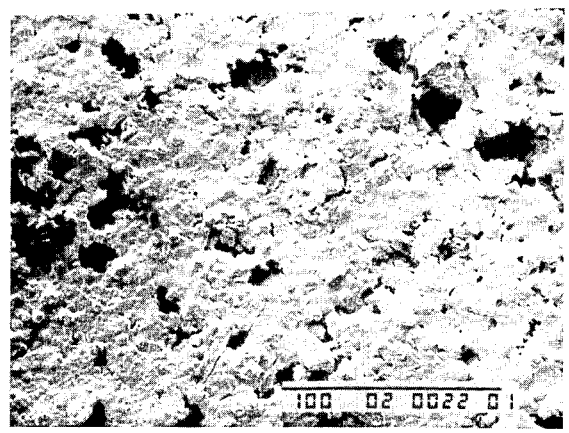
FIG_10b
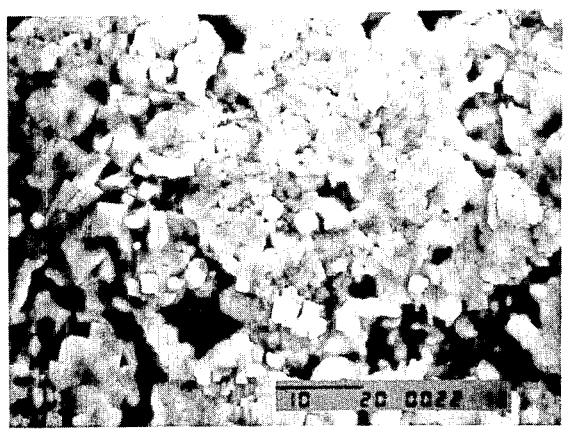

FIG_11
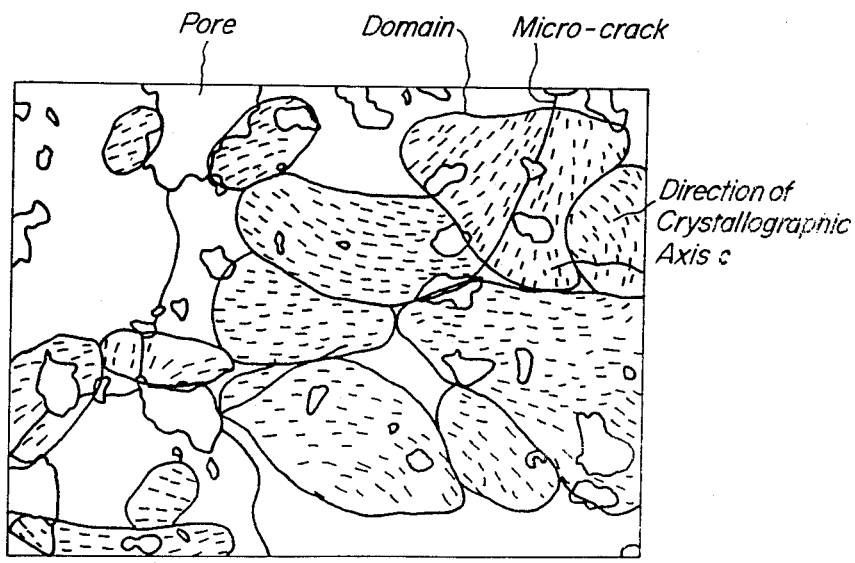

FIG_12a
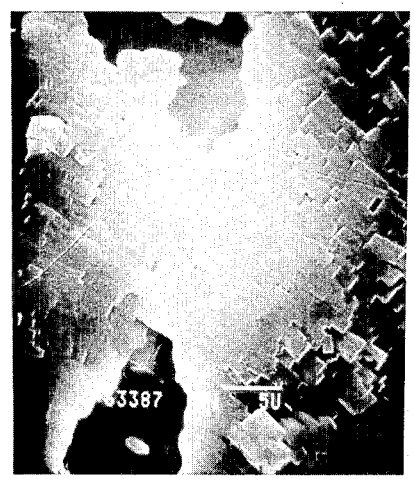
FIG_12b
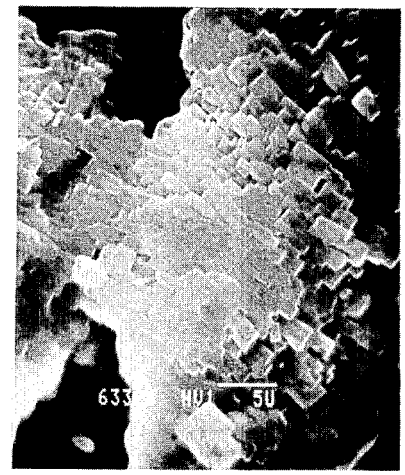

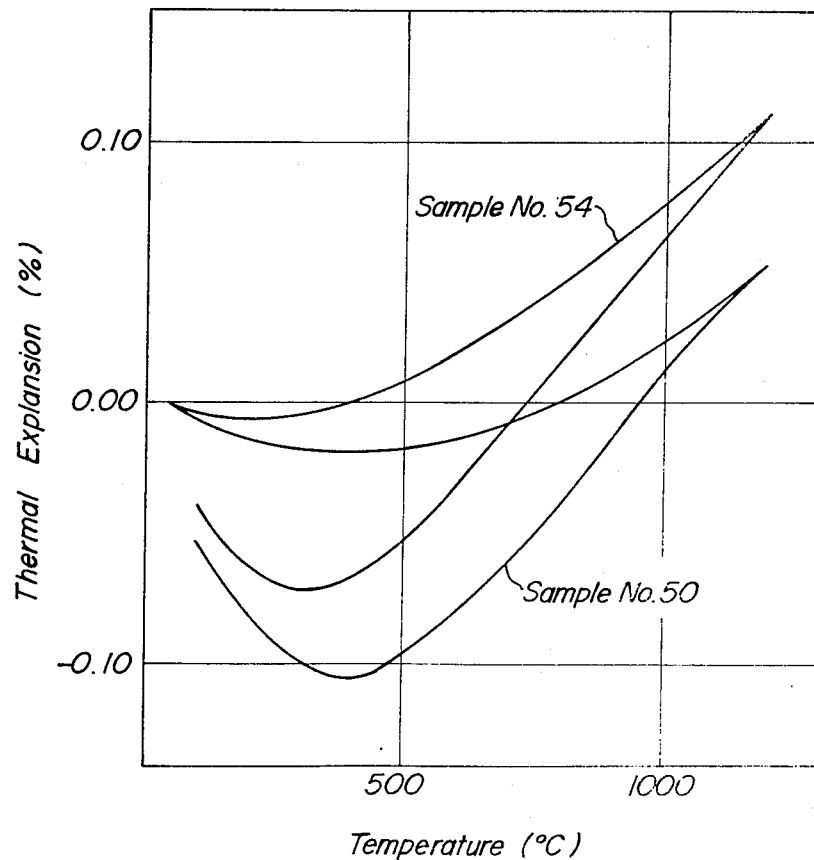
FIG_13

CORDIERITE HONEYCOMB-STRUCTURAL BODY AND A METHOD FOR PRODUCING THE SAME

BACKGROUND OF THE INVENTION (1) Field of the Invention

The present invention relates to a cordierite honeycomb-structural catalyst carrier, and more particularly relates to a low-thermal expansion honeycomb-structural body having excellent thermal shock resistance, coatability, that is, coating capability of a high specific surface area material and a catalyst, and further having excellent thermal shock resistance after coating, which body is used as a carrier for a catalyst for purifying exhaust gas of an automobile, and a method for producing the cordierite honeycomb-structural body.

(2) Related Art Statement

There have recently been increasingly demanded materials having excellent heat resistance and thermal shock resistance corresponding to the progress of industrial technique. Particularly, the thermal shock resistance is one of the important properties demanded in ceramic honeycomb catalyst carriers to be used in purifying apparatuses for automobile exhaust gas. The ceramic honeycomb catalyst carrier to be used in a purifying apparatus for automobile exhaust gas is exposed to vigorous heat generation caused by a catalytic reaction of uncombusted hydrocarbons with carbon monoxide contained in the exhaust gas and to temperature variations by the rapid heating and rapid cooling at the start and stop of the automobile engine. Therefore the ceramic honeycomb catalyst carrier must have a thermal shock resistance high enough to resist the thermal stress caused by the temperature difference generated in the honeycomb-structural body. Particularly, the ceramic honeycomb catalyst carrier must have high thermal shock resistance in order not to be adversely influenced by the arrangement of the purifying apparatus near the engine for the purpose of increasing the catalytic activity, and by the high speed running of a car.

The thermal shock resistance is expressed by the tolerable temperature difference in the rapid heating or in the rapid cooling, and it has been known that this tolerable temperature difference is in inverse proportion to the coefficient of thermal expansion of a honeycomb-structural body among various properties thereof. That is, as a ceramic honeycomb-structural body has a smaller coefficient of thermal expansion, the honeycomb-structural body has a larger tolerable temperature difference, and that, in the honeycomb-structural body, its coefficient of thermal expansion in a direction (FIG. 4, axis B direction) perpendicular to the flow passage has a particularly high influence upon the tolerable temperature difference.

It has hitherto been known that cordierite ceramics are low in thermal expansion. For example, U.S. Pat. No. 3,885,977 (Japanese Patent Laid-open Application No. 50-75,611) discloses an oriented cordierite ceramic having a coefficient of thermal expansion of lower than $11 \times 10^{-7}/°C$. within the temperature range of $25°-1,000°$ C. U.S. Pat. No. 3,885,977 discloses a planar orientation of cordierite due to plating clay or delaminated clay of kaolin or the like, and discloses a composition which uses silica as a raw material and has a low coefficient of thermal expansion of $0.56 \times 10^{-6}/°C$. within the temperature range of $25°-1,000°$ C.

This silica type honeycomb-structural body disclosed in U.S. Pat. No. 3,885,977 has a coefficient of thermal expansion of $(1.01-1.08) \times 10^{-6}/°C$. in a direction (in the axis B direction in FIG. 4) perpendicular to the flow passage of the honeycomb structure, which is higher than the coefficient of thermal expansion of $(0.62-0.78) \times 10^{-6}/°C$. in the flow passage direction (in the axis A direction in FIG. 4) of the honeycomb structure as disclosed in its working examples. Further, in this U.S. patent, the coefficient of thermal expansion in the axis B direction, which influences substantially the thermal shock resistance of the honeycomb-structural body, cannot be satisfactorily decreased.

U.S. Pat. No. 3,950,175 (Japanese Patent Laid-open Application No. 50-75,612) discloses that a cordierite based porous ceramic having open pores, at least 20% of which have a diameter larger than 10 $\mu$m, can be obtained by replacing, partly or wholly, talc or clay contained in the starting materials by pyrophyllite, kyanite, quartz, silica, such as fused silica, or a silica-alumina source material.

Although this U.S. Pat. No. 3,950,175 discloses a cordierite based porous ceramic honeycomb-structural body produced by using fused silica as a silica raw material and having a large number of large pores having a diameter of larger than 10 $\mu$m, this U.S. patent does not disclose the production of a low-thermal expansion cordierite honeycomb-structural body. Further, this U.S. patent, a cordierite honeycomb-structural body having a low coefficient of thermal expansion in its axis B direction cannot be obtained.

Japanese Patent Application Publication No. 57-28,390 discloses that the use of talc having an average particle size of 5-150 $\mu$m can produce a ceramic honeycomb-structural body having a low thermal expansion of not higher than $1.6 \times 10^{-6}/°C$. within the temperature range of $25-1,000°$ C. However, this Japanese Patent application publication does not disclose at all a composition which gives a ceramic honeycomb-structural body having a low thermal expansion of lower than $0.9 \times 10^{-6}/°C$. within the temperature range of $25°-1,000°$ C., and a ceramic honeycomb-structural body having satisfactorily low expansion in both of its axis A and axis B directions cannot be obtained.

The inventors have disclosed in U.S. Pat. No. 4,772,580 that finely divided talc having a particle size of not larger than 5 $\mu$m is used as a base material, and is used in combination with high-purity non-crystalline silica and finely divided alumina in order to produce a compact ceramic honeycomb-structural body having a porosity of not higher than 30%. However, a cordierite honeycomb-structural body having a low thermal expansion lower than $0.3 \times 10^{-6}/°C$. within the temperature range of $40°-800°$ C. can not readily be obtained by the method of this U.S. patent application.

The inventors have succeeded in the production of a cordierite honeycomb-structural body having a porosity of higher than 30% but not higher than 42% and having low thermal expansion in its axis A direction and in its axis B direction.

In a ceramic honeycomb-structural body to be used as a catalyst carrier, not only its low thermal expansion property, but also its coatability with a high specific surface area material and a catalyst are important properties.

It has been necessary to coat γ-alumina having a large specific surface area on the surface of walls of a cordierite honeycomb-structural body in order to support a catalyst substance. The coatability with a high specific area material and a catalyst is one of the important properties demanded from a cordierite honeycomb-structural body to be used as a catalyst carrier. The cordierite honeycomb-structural body to be used as a catalyst carrier also must have a certain degree of porosity in order to satisfy the above described demands and to carry out the mass production of cordierite honeycomb catalysts.

Honeycomb catalysts are produced by coating the surface of a cordierite honeycomb-structural body having a low thermal expansion with a high specific surface area material, such as activated alumina or the like, having a thermal expansion remarkably higher than that of the cordierite honeycomb-structural body. Therefore, when the thermal expansion of a cordierite honeycomb-structural body is merely decreased, the thermal shock resistance of the resulting honeycomb catalyst can not be improved. That is, such a technique is demanded that the increasing of thermal expansion of the cordierite honeycomb-structural body due to the coating its surface with a high specific surface area material and a catalyst is suppressed as small as possible.

Japanese Patent Application Publication No. 51-44,913 discloses that the coatability of a ceramic honeycomb-structural body is improved by a method, wherein a ceramic powder is deposited onto the surface of the thin walls of the honeycomb-structural body, and the ceramic powder-deposited honeycomb-structural body is fired to form a surface layer having pores in a volume of not less than 0.1 cm$^3$/g, each pore having a diameter of not smaller than 5 μm.

However, in the method of this Japanese Patent Application Publication No. 51-44,913, the deposition step of ceramic powder to the honeycomb-structural body is required, and the resulting honeycomb catalyst carrier is expensive. Moreover, a honeycomb catalyst carrier having pores having a diameter of 0.5-5 μm defined in the present invention is difficult to produce.

Japanese Patent Laid-open Application No. 58-14,950 discloses that, when activated alumina of a high specific surface area material is to be coated onto a cordierite honeycomb-structural body, an organic substance, such as methyl cellulose or the like, is precoated onto the honeycomb-structural body so that the activated alumina can not enter into micro-cracks formed in the cordierite honeycomb-structural body, whereby the thermal shock resistance of a cordierite honeycomb catalyst is improved. However, the adhesion of high specific surface area material, such as activated alumina, to the cordierite honeycomb-structural body is deteriorated during the use of the resulting honeycomb catalyst, and the coated layer is apt to peel off. Moreover, working steps required for the coating are increased, and the resulting cordierite honeycomb catalyst is very expensive.

The inventors have succeeded in the production of a cordierite honeycomb-structural body to be used as a catalyst carrier, having excellent thermal shock resistance after coating with a high specific surface area material and a catalyst, by limiting not only the porosity and coefficient of thermal expansion of the body but also the distribution of the diameters of pores in the body.

SUMMARY OF THE INVENTION

An object of the present invention is to obviate the above described drawbacks and to provide a cordierite honeycomb-structural body to be used as a catalyst carrier, having excellent heat resistance and thermal shock resistance by limiting the coefficient of thermal expansion in its axis A direction and axis B direction to values lower than those of conventional cordierite honeycomb-structural body, and a method for producing the body.

Another object of the present invention is to provide a cordierite honeycomb-structural body to be used as a catalyst carrier, having excellent heat resistance and thermal shock resistance, and further having excellent coatability with a high specific surface area material and a catalyst, and being small in the deterioration of thermal shock resistance, said deterioration being caused by the coating with the high specific surface area surface material and the catalyst, which have a higher thermal expansion than that of the cordierite honeycomb-structural body, and a method for producing the body.

The first aspect of the present invention lies in a cordierite honeycomb-structural body to be used as a catalyst carrier, which has a chemical composition consisting mainly of 42-56% by weight of $SiO_2$, 30-45% by weight of $Al_2O_3$ and 12-16% by weight of MgO, has a crystal phase consisting mainly of cordierite, has a porosity of higher than 30% but not higher than 42%, and has a coefficient of thermal expansion of not higher than $0.3 \times 10^{-6}/°C$. within the temperature range of 40–800° C. in the flow-passage direction (axis A direction in FIG. 4) of the honeycomb structure and a coefficient of thermal expansion of not higher than $0.5 \times 10^{-6}/°C$. within the temperature range of 40°-800° C. in a direction (axis B direction in FIG. 4) perpendicular to the flow passage of the honeycomb structure.

The second aspect of the present invention lies in a method for producing a cordierite honeycomb-structural body to be used as a catalyst carrier, comprising mixing talc having an average particle size of 5-100 μm, alumina having an average particle size of not larger than 2 μm, higher purity non-crystalline silica having an average particle size of not larger than 15 μm and other cordierite-forming materials so as to form a mixture consisting mainly of 42-56% by weight of $SiO_2$, 30-45% by weight of $Al_2O_3$ and 12-16% by weight of MgO calculated as oxides, kneading the mixture together with a plasticizer and an organic binder to form an extrudably plasticated batch, extruding the plasticized batch into a shaped article having a honeycomb structure by an extrusion-molding method, drying the shaped article, and firing the dried shaped article at a temperature of 1,350°-1,440° C.

The third aspect of the present invention lies in a cordierite honeycomb-structural body to be used as a catalyst carrier, which has a distribution of the diameters of pores such that the total volume of pores having a diameter of 0.5-5 μm is not less than 40% based on the total pore volume and the total volume of pores having a diameter of not smaller than 10 μm is not more than 30% based on the total pore volume in addition to the chemical composition, crystal phase, porosity, coefficient of thermal expansion defined in the honeycomb-structural body of the first aspect of the present invention.

The fourth aspect of the present invention lies in that talc having an average particle size of 5-15 μm and high-purity non-crystalline silica having an average size of not larger than 12 μm are used in place of the talc and high-purity non-crystalline silica used in the method of the second aspect of the present invention.

BRIEF DESCRIPTION OF THE DRAWINGS

FIG. 5 is a graph illustrating a relation between the ratio in percentage of the total volume of pores having a diameter of 0.5–5 μm to the total pore volume in a cordierite honeycomb-structural body obtained in Example 2 and the loading amount of a coating material on the body;

FIG. 6 is a graph illustrating a relation between the ratio in percentage of the total volume of pores having a diameter of not smaller than 10 μm to the total pore volume in a cordierite honeycomb-structural body obtained in Example 2 and the loading amount of a coating material on the body;

FIG. 7 is a graph illustrating a relation between the coefficient of thermal expansion in the axis A direction of a cordierite honeycomb-structural body obtain in Example 2 and the thermal shock resistance temperature of the honeycomb-structural body;

FIG. 8 is a graph illustrating a relation between the coefficient of thermal expansion in the axis B direction of a cordierite honeycomb-structural body obtained in Example 2 and the thermal shock resistance temperature of the body;

FIGS. 9a and 9b are SEM (scanning electron microscope) photographs of 50 magnifications and 2,000 magnifications, respectively, illustrating the crystal structure of the cordierite honeycomb-structural body of Sample No. 50 in Example 2;

FIGS. 10a and 10b are SEM photographs of 50 magnifications and 2,000 magnifications, respectively, illustrating the crystal structure of the cordierite honeycomb-structural body of Sample No. 54 in Example 2;

FIG. 11 is a schematic view for explaining the regions in the SEM photograph shown in FIG. 9a;

FIGS. 12a and 12b are SEM photographs illustrating crystal structures of the cordierite honeycomb structural body of Sample No. 50 at room temperature and at 800° C., respectively, in the same visual field; and FIG. 13 is a graph illustrating thermal expansion hysteresis curves up to 1,200° C. of cordierite honeycomb-structural bodies of Samples Nos. 50 and 54.

DESCRIPTION OF THE PREFERRED EMBODIMENT

Figure 1:
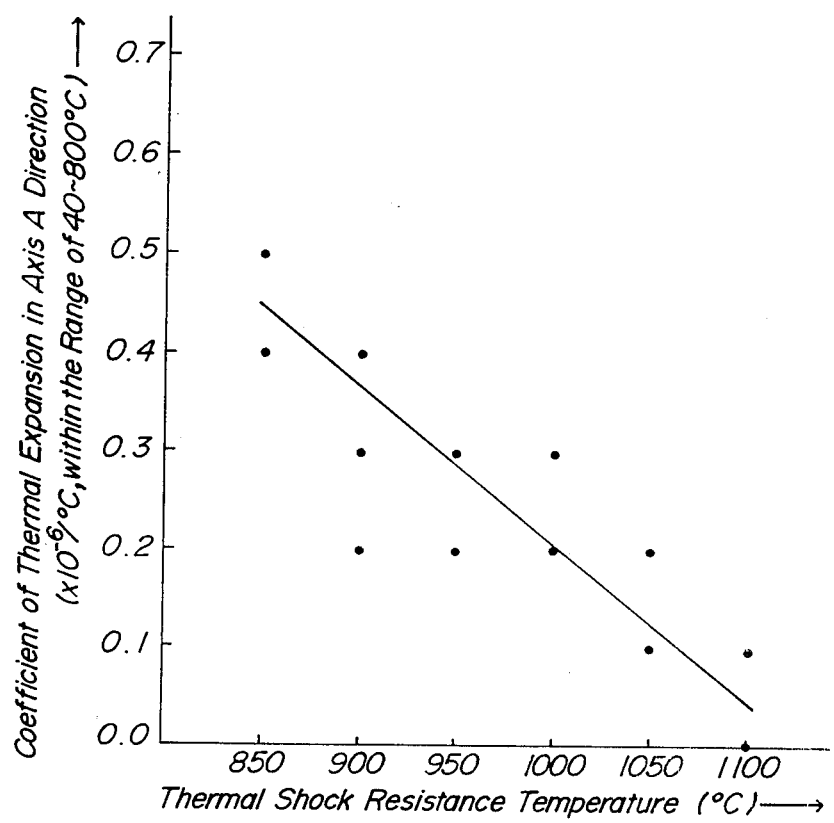
FIG. 1 is graph illustrating a relation between the coefficient of thermal expansion in the axis A direction of the cordierite honeycomb-structural body obtained in Example 1 and the thermal shock resistance temperature of the body.

The reason why a cordierite honeycomb-structural body having a low thermal expansion coefficient can be obtained in the present invention is as follows. The mechanism in the cordierite-forming reaction of talc, kaolin and alumina in the presence of high-purity non-crystalline silica is remarkable different from the mechanism in the cordierite forming reaction of talc, kaolin and alumina without the use of high-purity non-crystalline silica, and when high-purity non-crystalline silica is used, cordierite crystals are formed at a higher temperature than in the case wherein high-purity non-crystalline silica is not used. Hence, domains wherein cordierite crystals are oriented in a preferable direction, that is, domains having a maximum diameter of at least 20 μm, wherein the crystallographic axes c of cordierite crystals are arranged in the same direction, can be obtained. Moreover, a microstructure, wherein idiomorphic cordierite crystals which have an average length of 1–5 μm in their crystallographic axis c direction and contain at least 80% of cordierite crystals having an aspect ration of (length of axis c)/(length of axis a) of at least 1.5, have been predominantly developed.

Moreover, the micro-structure of the cordierite produced from talc, kaolin, alumina and high-purity non-crystalline silica in the present invention has such a characteristic property that, although the amount of micro-cracks formed in the cordierite is not so different from the amount of micro-cracks formed in the cordierite formed from talc, kaolin and alumina, many of micro-cracks are formed extending along the crystallographic axis c direction of cordierite crystals in the domain structure, and absorb the positive thermal expansions of cordierite crystal in its crystallographic axes a and b directions, and contribute highly to the prevention of the expansion of the cordierite, and hence the resulting honeycomb-structural body is low in the thermal expansion.

When finely divided activated alumina is used as a raw material without the use of high-purity non-crystalline silica, the resulting cordierite honeycomb-structural body has a remarkably high thermal expansion, and hence it is indispensable to use finely divided activated alumina in combination with high-purity non-crystalline silica in the production of a cordierite honeycomb-structural body having a low thermal expansion in the present invention.

It is necessary that the cordierite honeycomb-structural body having a low thermal expansion of the present invention has a chemical composition consisting mainly of 42–56% by weight, preferably 47–53% by weight, of $SiO_2$, 30–45% by weight, preferably 32–38% by weight, of $Al_2O_3$, and 12–16% by weight, preferably 12.5–15% by weight, of MgO. The cordierite honeycomb-structural body may contain incidental impurities, such as $TiO_2$, CaO, CNaO and $Fe_2O_3$, in a total amount of not larger than 2.5% by weight.

It is necessary that the cordierite honeycomb-structural body of the present invention has a crystal phase consisting substantially of cordierite crystals, and contains at least 90% by weight of cordierite crystals. The crystal phase may contain other crystals, such as mullite and spinel (including sapphire).

When a cordierite honeycomb-structural body has a porosity of not higher than 30%, its coatability with a high specific surface material and a catalyst is poor. While, when the honeycomb-structural body has a porosity higher than 42%, the body is poor in strength and further in thermal shock resistance after coating. Therefore, the porosity is limited to higher than 30% but not higher than 42%.

In the cordierite honeycomb-structural body of the present invention, when either the coefficient of thermal expansion within the temperature range of 40°–800° C. in the flow passages (axis A) direction of the honeycomb structure exceeds $0.3 \times 10^{-6}/°C.$, or that within the temperature range of 40°–800° C. in a direction (axis B direction) perpendicular to the flow passage of the honeycomb structure exceeds $0.5 \times 10^{-6}/°C.$, the cordierite honeycomb-structural body is poor in thermal shock resistance. Therefore, the coefficient of thermal expansion in the axis A direction is limited to not higher than $0.3 \times 10^{-6}/°C.$, and that in the axis B direction is limited to not higher than $0.5 \times 10^{-6}/°C.$ within the temperature range of 40°–800° C. The coefficient of thermal expansion in the axis A direction is preferably not higher than $0.2 \times 10^{-6}/°C.$ within the temperature range of 40°–800° C.

Furthermore, the cordierite honeycomb-structural body of the present invention has excellent thermal shock resistance after coating with a high specific surface area material and a catalyst due to the improvement of the coatability with the coating material. The reason will be explained hereinafter.

It has hitherto been known that the water absorption and porosity of a honeycomb-structural body have an influence upon its coatability with a high specific surface area material, such as activated alumina, and a catalyst. However, the inventors have newly found out that pores have a diameter within a certain range, that is, pores having a diameter of 0.5–5 μm, have more of an influence upon the coatability than the porosity. Moreover, the inventors have found out that pores having a diameter of not smaller than 10 μm, which have been formed in a cordierite honeycomb-structural carrier in order to maintain its porosity, adversely deteriorate the coatability, and increase the dispersion of the loading amount of a coating material.

The effect of pores having a diameter of 0.5–5 μm for improving the coatability of a cordierite honeycomb-structural body is probably due to the reason that the depositing speed of a high specific surface area material such as activated alumina, or of a catalyst to pores is maximum in the case where the pores have a diameter of 0.5–5 μm, due to the particle size of the high specific surface area material and the water-absorbing phenomenon by capillary action. When pores have a diameter of not smaller than 10 μm, the loading amount of a coating material on the cordierite honeycomb-structural body disperses due to the impregnation of the surface pores with a high specific surface area material.

Further, it has been discovered that the porosity of a cordierite honeycomb structural body has a correlation to its coatability. When the porosity is not higher than 30%, the coatability is poor. When the porosity of a honeycomb-structural body is increased while maintaining the ratio of the total volume of pores having a diameter of 0.5–5 μm to the total pore volume, the coatability of the honeycomb-structural body is improved, but another important property, that is, mechanical strength, required for a honeycomb-structural catalyst is deteriorated.

It has been newly found out that pores having a diameter of not smaller than 10 μm have an important role with respect to the thermal shock resistance of a cordierite honeycomb-structural body after coating with a high specific surface area material and a catalyst. Activated alumina having a high specific surface area, which is ordinarily used in order to maintain the catalytic activity, has a particle size of 5–10 μm, and therefore, although the depositing speed of the activated alumina is low, the activated alumina particles easily enter into pores having a diameter of not smaller than 10 μm. Particularly, the activated alumina enter into the interior of the partition wall of the honeycomb-structural body, causing a remarkably large thermal expansion of the honeycomb-structural body. Accordingly, it has been found that pores having a diameter of not smaller than 10 μm, which have hitherto been formed in a cordierite honeycomb-structural body in order to improve its coatability, have an adverse influence upon both its coatability and its thermal shock resistance after coating.

The reason for the limitation in the distribution of the diameters of pores in the honeycomb-structural body in the third aspect of the present invention is as follows.

When the total volume of pores having a diameter of 00.5–5 μm is less than 40% based on the total pore volume, the honeycomb-structural body is poor in the coatability, and therefore the total volume of pores having a diameter of 0.5–5 μm is limited to not less than 40% based on the total pore volume. Further, when the total volume of pores having a diameter of not smaller than 10 μm exceeds 30% based on the total pore volume, the honeycomb-structural body has coatability, thus causing dispersion in the loading amount, and further has thermal shock resistance after coating. Therefore, the total volume of pores having a diameter of not smaller than 10 μm is limited to not more than 30% based on the total pore volume. Further, it is preferable that the total volume of pores having a diameter of 0.5–5 μm is not less than 50% based on the total pore volume, and the total volume of pores having a diameter of not smaller than 10 μm is not more than 20% based on the total pore volume.

In the method for producing cordierite honeycomb-structural bodies according to the second and fourth aspects of the present invention, when talc having an average particle size of smaller than 5 μm is used, the resulting cordierite honeycomb-structural body has an excessively high thermal expansion and has a considerably low porosity, and when talc having an average particle size of larger than 100 μm is used, the resulting cordierite honeycomb-structural body has excessively high thermal expansion and porosity. Therefore, in the method for producing a cordierite honeycomb-structural body according to the second aspect of the present invention, the average particle size of talc is limited to 5–100 μm. Further, when the average particle size of talc exceeds 15 μm, the above described limitation with respect to the distribution of the diameters of pores in the resulting cordierite honeycomb-structural body of the third aspect of the present invention cannot be satisfied, and the coatability of the honeycomb-structural body is poor. Therefore, the average particle size of talc to be used in the method for producing a cordierite honeycomb-structural body in the fourth aspect of the present invention, which has a low thermal expansion and an excellent coatability, is limited to 5–15 μm, preferably 7–12 μm.

When the particle size of alumina to be used in the methods of the second and fourth aspects of the present invention exceeds 2 μm, the resulting cordierite honeycomb-structural body has an excessively high thermal expansion, and hence the average particle size of alumina is limited to not larger than 2 μm. When low-soda alumina having an $Na_2O$ content of not higher than 0.12% by weight is used, a cordierite honeycomb-structural body having a low thermal expansion can be produced more easily, and therefore low-soda alumina is preferably used.

When the average particle size of silica to be used in the method of present invention exceeds 15 μm, the resulting cordierite honeycomb-structural body has an excessively high thermal expansion coefficient in its axis B direction and excessively high porosity, and therefore the average particle size of silica to be used in the method of the second aspect of the present invention is limited to not larger than 15 μm. Moreover, when the average particle size of silica exceeds 12 μm, the above described limitation with respect to the distribution of the diameters of pores in the resulting cordierite honeycomb-structural body of the third aspect of the present invention can not be satisfied, and further the honeycomb-structural body exhibits coatability. Therefore, the average particle size of silica to be used in the method of the fourth aspect of the present invention is limited to not larger than 12 μm, preferably not larger than 8 μm.

When quartz is used as a silica component in the raw material mixture, the resulting cordierite honeycomb-structural body has too high a thermal expansion and porosity, and therefore silica to be used in the methods of second and fourth aspects of the present invention is limited to non-crystalline silica. The use of non-crystalline silica in an amount of 8–20% by weight is most effective for the production of a cordierite honeycomb-structural body having low thermal expansion, and hence 8–20% by weight, based on the total amount of the raw material mixture, of non-crystalline silica is preferably used.

The use of kaolin having an average particle size, which is not larger than 2 μm and is not larger than ⅓ of the average particle size of talc, accelerates the orientation of cordierite crystals and results in a cordierite honeycomb-structural body having low thermal expansion. Therefore, kaolin having the above described average particle size is preferably used in the methods of the second and fourth aspects of the present invention.

The use of aluminum hydroxide having an average particle size of not larger than 2 μm as an alumina source is very effective for accelerating the orientation of cordierite crystals and for producing a cordierite honeycomb-structural body having a low thermal expansion, and therefore aluminum hydroxide having an average particle size of not larger than 2 μm is preferably used as an alumina source in the methods of the second and fourth aspects of the present invention.

The following examples are given for the purpose of illustration of this invention and are not intended as limitations thereof.

EXAMPLE 1

Raw materials having chemical analysis values and particle sizes shown in Table 1 were mixed according to the batch composition of Sample Nos. 1–19 shown in Table 2, and the resulting mixture were kneaded together with methyl cellulose to form extrusion-moldable batches.

Then, each batch was extruded into a cylindrical green honeycomb-structural body having a diameter of 93 mm and a height of 100 mm, which body had a wall thickness of 152 μm and had 62 cells per one square centimeter, each cell having a square cross-sectional shape. After the green honeycomb-structural body was dried, the body was fired at a firing temperature shown in Table 2 to produce a sintered honeycomb-structural body. As the properties of the sintered body, the coefficients of thermal expansion in the axis A direction and in the axis B direction, the porosity, the amount of cordierite crystals and the thermal shock resistance were measured. The obtained results are shown in Table 2.

Figure 2:
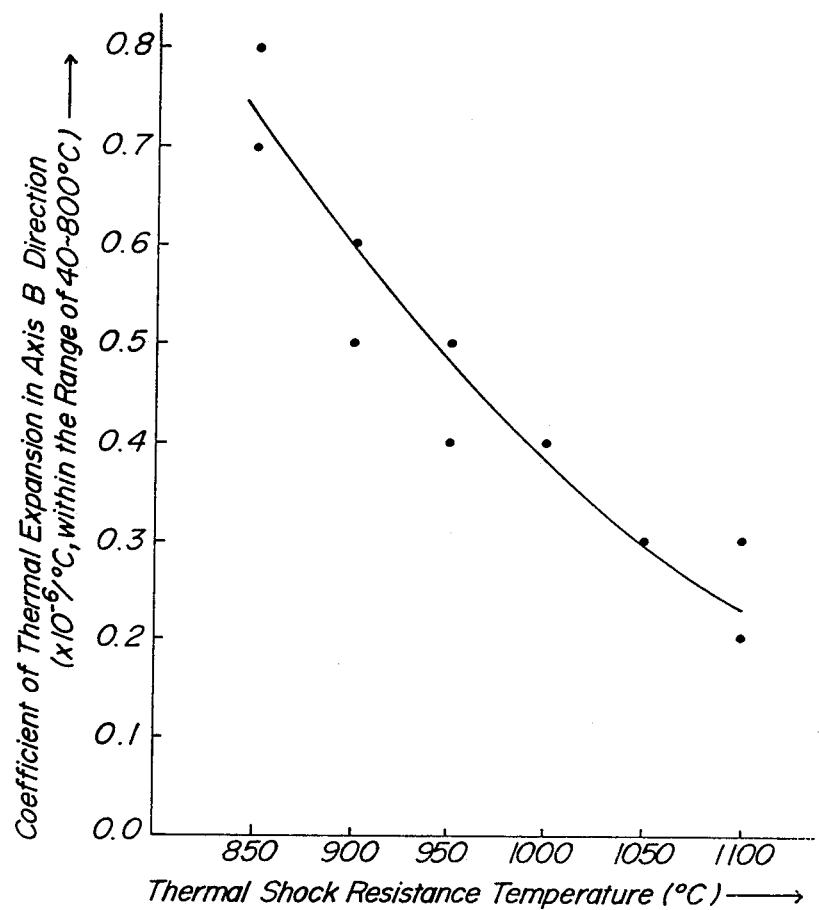
FIG. 2 is a graph illustrating a relation between the coefficient of thermal expansion in the axis B direction of the cordierite honeycomb-structural body obtained in Example 1 and the thermal shock resistance temperature of the body.
Figure 3:
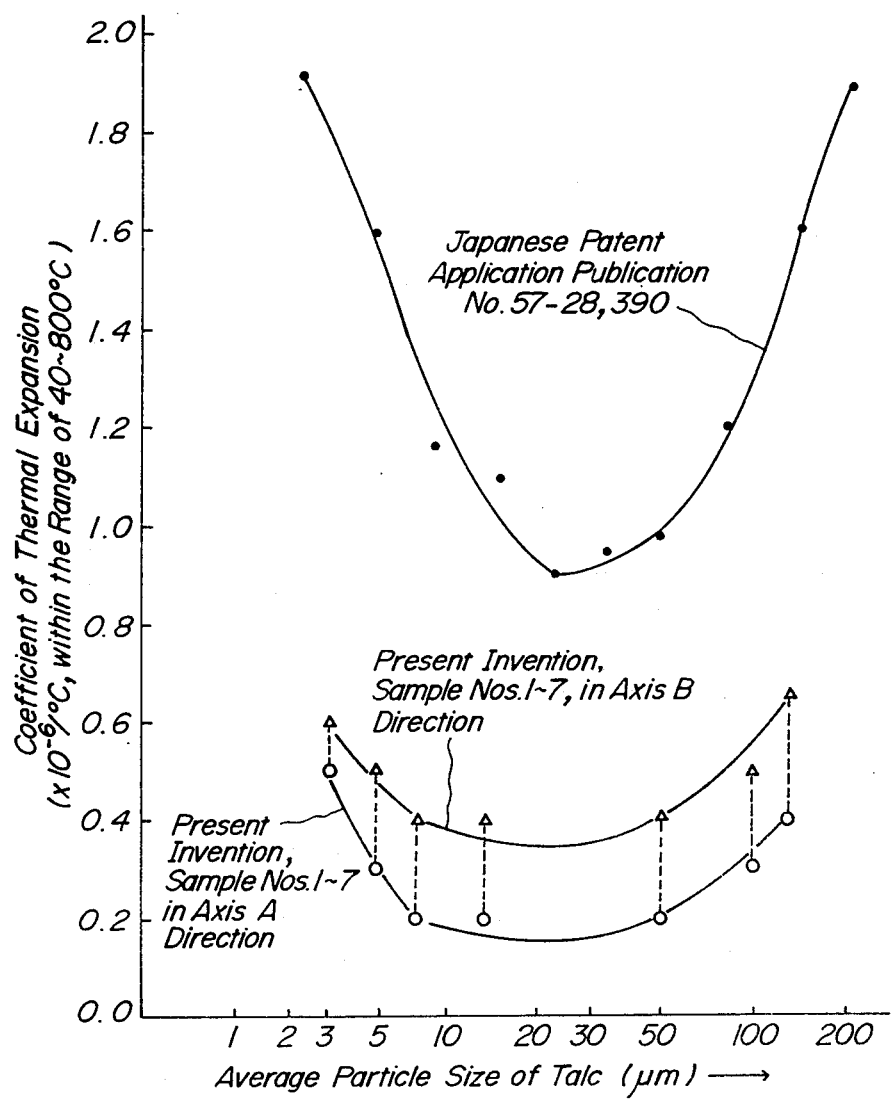
FIG. 3 is a graph illustrating a relation between the average particle size of talc and the coefficient of thermal expansion of the resulting cordierite honeycomb-structural body.
Figure 4:
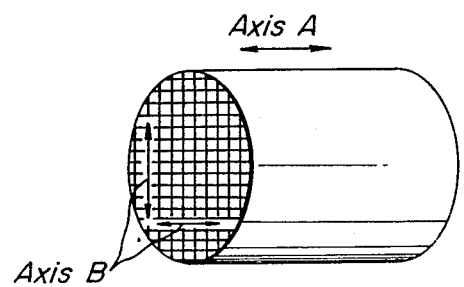
FIG. 4 is a perspective view illustrating one embodiment of honeycomb-structural bodies.

The above obtained results are illustrated in FIGS. 1–3. FIG. 1 illustrates a relation between the coefficient of thermal expansion of the resulting cordierite honeycomb-structural body in its axis A direction and the thermal shock resistance temperature of the body, and FIG. 2 illustrates a relation between the coefficient of thermal expansion of the resulting honeycomb structural body in its axis B direction and the thermal shock resistance temperature of the body. FIG. 3 illustrates a relation between the average particle sizes of talc used in Sample Nos. 1–7 and the coefficients of thermal expansion of the resulting cordierite honeycomb-structural bodies in their axis A direction and in their axis B direction together with the relation between the average particle size of talc and the coefficient of thermal expansion of the resulting honeycomb-structural body shown in FIG. 1 of Japanese Patent Application Publication No. 57-28,390.

The average particle size of talc (A), (B) and (C) in the raw materials shown in Table 1 was measured by the dry separation method by means of JIS standard sieve, and the average particle size of the raw materials other than talc (A), (B) and (C) were measured by a Sedigraph sold by Micromeritics Co.

TABLE 1(a)

| | Average particle size (μm) | Ignition loss | $SiO_2$ | $Al_2O_3$ | MgO | $TiO_2$ | $Fe_2O_3$ | CaO + $Na_2O$ + $K_2O$ (wt %) |
|---|---|---|---|---|---|---|---|---|
| Talc | | | | | | | | |
| (A) | 135 | 5.6 | 61.2 | 0.9 | 30.9 | — | 0.9 | 0.3 |
| (B) | 100 | 5.6 | 61.3 | 0.9 | 30.7 | — | 0.9 | 0.3 |
| (C) | 50 | 5.6 | 61.4 | 0.9 | 30.7 | — | 0.8 | 0.3 |
| (D) | 18.0 | 5.6 | 61.1 | 1.0 | 30.7 | — | 1.0 | 0.3 |
| (E) | 15.0 | 5.7 | 60.9 | 1.2 | 30.7 | — | 1.0 | 0.3 |
| (F) | 13.0 | 5.7 | 61.0 | 1.2 | 30.8 | — | 0.9 | 0.3 |
| (G) | 12.0 | 5.7 | 61.0 | 1.2 | 30.8 | — | 0.9 | 0.3 |
| (H) | 7.0 | 5.7 | 61.1 | 1.1 | 30.8 | — | 0.9 | 0.3 |
| (I) | 5.0 | 5.7 | 60.9 | 1.2 | 30.8 | — | 1.0 | 0.3 |
| (J) | 3.2 | 5.7 | 61.2 | 1.0 | 30.7 | — | 0.9 | 0.3 |
| Kaolin | | | | | | | | |
| (A) | 3.8 | 13.9 | 45.5 | 38.6 | — | 1.0 | 0.4 | 0.2 |
| (B) | 2.0 | 13.9 | 45.5 | 38.6 | — | 0.8 | 0.4 | 0.2 |

TABLE 1(a)-continued

| | Average particle size (μm) | Ignition loss | SiO$_2$ | Al$_2$O$_3$ | MgO | TiO$_2$ | Fe$_2$O$_3$ | CaO + Na$_2$O + K$_2$O (wt %) |
|---|---|---|---|---|---|---|---|---|
| (C) | 1.2 | 13.8 | 45.3 | 38.6 | — | 0.8 | 0.5 | 0.2 |
| (D) | 0.3 | 13.8 | 45.4 | 38.0 | — | 1.4 | 0.7 | 0.2 |
| Calcined kaolin | | | | | | | | |
| (A) | 3.8 | 0.1 | 53.1 | 45.1 | — | 0.9 | 0.4 | 0.2 |
| (B) | 2.0 | 0.1 | 53.1 | 45.1 | — | 0.8 | 0.4 | 0.2 |
| (C) | 0.8 | 0.1 | 53.1 | 45.0 | — | 0.8 | 0.4 | 0.2 |

TABLE 1(b)

| | Average particle size (μm) | Ignition loss | SiO$_2$ | Al$_2$O$_3$ | MgO | TiO$_2$ | Fe$_2$O$_3$ | CaO + Na$_2$O + K$_2$O (wt %) |
|---|---|---|---|---|---|---|---|---|
| Alumina | | | | | | | | |
| (A) *0 | 4.0 | 0.3 | — | 99.4 | — | — | — | 0.3 Na$_2$O |
| (B) *0 | 2.0 | 0.3 | — | 99.4 | — | — | — | 0.3 Na$_2$O |
| (C) *1 | 2.0 | 0.2 | — | 99.6 | — | — | — | 0.12 Na$_2$O |
| (D) *0 | 1.0 | 0.2 | — | 99.4 | — | — | — | 0.3 Na$_2$O |
| (E) *1 | 1.0 | 0.2 | — | 99.6 | — | — | — | 0.12 Na$_2$O |
| Aluminum hydroxide | | | | | | | | |
| (A) | 2.0 | 33.8 | — | 64.9 | — | — | — | 0.3 |
| (B) | 1.2 | 33.7 | — | 64.8 | — | — | — | 0.3 |
| Silica | | | | | | | | |
| (A) *2 | 18.5 | 0.2 | 99.5 | 0.1 | — | — | — | — |
| (B) *2 | 15.0 | 0.2 | 99.5 | 0.1 | — | — | — | — |
| (C) *3 | 15.0 | 0.2 | 99.6 | 0.1 | — | — | — | — |
| (D) *2 | 12.0 | 0.2 | 99.5 | 0.1 | — | — | — | — |
| (E) *3 | 12.0 | 0.2 | 99.6 | 0.1 | — | — | — | — |
| (F) *2 | 9.1 | 0.3 | 99.4 | 0.1 | — | — | — | — |
| (G) *3 | 9.8 | 0.2 | 99.6 | 0.1 | — | — | — | — |
| (H) *2 | 6.0 | 0.3 | 99.3 | 0.1 | — | — | — | — |
| (I) *2 | 2.0 | 0.3 | 99.4 | 0.1 | — | — | — | — |

*0: Ordinary soda alumina
*1: Low-soda alumina
*2: Non-crystalline fused silica
*3: Quartz TABLE 2(a)-1

| Sample No. | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | Firing temperature (°C.) |
|---|---|---|---|---|---|---|---|
| 1 | 40.6 (135) | 14.4 (3.8) | 9.0 (3.8) | 10.5 (2.0) | 15.5 (2.0) | 10.0 (15.0) | 1,400 |
| 2 | 40.6 (100) | 14.4 (2.0) | 9.0 (2.0) | 10.5 (2.0) | 15.5 (2.0) | 10.0 (15.0) | 1,400 |
| 3 | 40.6 (50) | 14.4 (2.0) | 9.0 (2.0) | 10.5 (2.0) | 15.5 (1.2) | 10.0 (15.0) | 1,400 |
| 4 | 40.6 (13.0) | 14.4 (2.0) | 9.0 (2.0) | 10.5 (2.0) | 15.5 (1.2) | 10.0 (15.0) | 1,400 |
| 5 | 40.6 (7.0) | 14.4 (2.0) | 9.0 (2.0) | 10.5 (2.0) | 15.5 (1.2) | 10.0 (15.0) | 1,400 |
| 6 | 40.6 (5.0) | 14.4 (1.2) | 9.0 (2.0) | 10.5 (2.0) | 15.5 (1.2) | 10.0 (15.0) | 1,400 |
| 7 | 40.6 (3.2) | 14.4 (0.3) | 9.0 (1.2) | 10.5 (2.0) | 15.5 (1.2) | 10.0 (15.0) | 1,400 |
| 8 | 40.8 (13.0) | 15.0 (2.0) | 11.2 (2.0) | 12.4 (4.0) | 12.6 (1.2) | 8.0 (15.0) | 1,420 |
| 9 | 40.8 (13.0) | 15.0 (2.0) | 11.2 (2.0) | 12.4 (2.0) | 12.6 (1.2) | 8.0 (15.0) | 1,420 |
| 10 | 40.8 (13.0) | 15.0 (2.0) | 11.2 (2.0) | 12.4 (2.0)* | 12.6 (1.2) | 8.0 (15.0) | 1,420 |

TABLE 2(a)-2

| Sample No. | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | Firing temperature (°C.) |
|---|---|---|---|---|---|---|---|
| 11 | 40.8 (13.0) | 15.0 (2.0) | 11.2 (2.0) | 12.4 (1.0) | 12.6 (1.2) | 8.0 (15.0) | 1,420 |
| 12 | 40.8 (13.0) | 15.0 (2.0) | 11.2 (2.0) | 12.4 (1.2)* | 12.6 (1.2) | 8.0 (15.0) | 1,420 |
| 13 | 40.8 (13.0) | 15.0 (0.3) | 11.2 (0.8) | 12.4 (1.0)* | 12.6 (1.2) | 8.0 (15.0) | 1,420 |
| 14 | 40.8 (13.0) | 15.0 (2.0) | 11.2 (2.0) | 12.4 (2.0)* | 12.6 (1.2) | 8.0 (9.1) | 1,420 |
| 15 | 39.0 (7.0) | 15.0 (1.2) | 7.5 (2.0) | 12.0 (2.0)* | 14.5 (1.2) | 12.0 (18.5) | 1,430 |
| 16 | 39.0 (7.0) | 15.0 (1.2) | 7.5 (2.0) | 12.0 (2.0)* | 14.5 (1.2) | 12.0 (15.0) | 1,430 |

TABLE 2(a)-2-continued

| | Batch composition (wt %) | | | | | | |
|---|---|---|---|---|---|---|---|
| Sample No. | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | Firing temperature (°C.) |
| 17 | 39.0 (7.0) | 15.0 (1.2) | 7.5 (2.0) | 12.0 (2.0)* | 14.5 (1.2) | 12.0 (15.0)** | 1,430 |
| 18 | 39.0 (13.0) | 15.0 (1.2) | 7.5 (2.0) | 12.0 (2.0)* | 14.5 (1.2) | 12.0 (9.1) | 1,430 |
| 19 | 39.0 (50) | 15.0 (1.2) | 7.5 (2.0) | 12.0 (2.0)* | 14.5 (1.2) | 12.0 (9.1) | 1,430 |

*: Low-soda alumina
**: Quartz

TABLE 2(b)-1

| | Properties of sintered body | | | | | |
|---|---|---|---|---|---|---|
| Sample No. | Coefficient of thermal expansion in axis A direction ($\times 10^{-6}/$°C.) | Coefficient of thermal expansion in axis B direction ($\times 10^{-6}/$°C.) | *1 Porosity (%) | *2 Amount of cordierite crystals (wt %) | *3 Thermal shock resistance temperature (°C.) | Remarks |
| 1 | 0.4 | 0.7 | 43 | 92 | 850 | Comparative sample (talc: coarse) |
| 2 | 0.3 | 0.5 | 41 | 92 | 950 | Present invention |
| 3 | 0.2 | 0.4 | 37 | 93 | 1,000 | " |
| 4 | 0.2 | 0.4 | 36 | 93 | 1,050 | " |
| 5 | 0.2 | 0.4 | 34 | 93 | 1,000 | " |
| 6 | 0.3 | 0.5 | 34 | 92 | 950 | " |
| 7 | 0.5 | 0.6 | 31 | 92 | 900 | Comparative sample (talc: fine) |
| 8 | 0.5 | 0.7 | 36 | 91 | 850 | Comparative sample (alumina: coarse) |
| 9 | 0.3 | 0.5 | 35 | 91 | 950 | Present invention |
| 10 | 0.2 | 0.3 | 34 | 93 | 1,050 | " |

TABLE 2(b)-2

| | Properties of sintered body | | | | | |
|---|---|---|---|---|---|---|
| Sample No. | Coefficient of thermal expansion in axis A direction ($\times 10^{-6}/$°C.) | Coefficient of thermal expansion in axis B direction ($\times 10^{-6}/$°C.) | *1 Porosity (%) | *2 Amount of cordierite crystals (wt %) | *3 Thermal shock resistance temperature (°C.) | Remarks |
| 11 | 0.2 | 0.3 | 33 | 92 | 1,050 | Present invention |
| 12 | 0.1 | 0.3 | 32 | 93 | 1,100 | " |
| 13 | 0.1 | 0.2 | 31 | 93 | 1,100 | " |
| 14 | 0.1 | 0.3 | 33 | 92 | 1,050 | " |
| 15 | 0.2 | 0.6 | 43 | 90 | 900 | Comparative sample (silica: coarse) |
| 16 | 0.2 | 0.3 | 38 | 92 | 1,050 | Present invention |
| 17 | 0.5 | 0.8 | 43 | 89 | 850 | Comparative sample (quartz) |
| 18 | 0.2 | 0.3 | 38 | 91 | 1,050 | Present invention |
| 19 | 0.2 | 0.4 | 39 | 91 | 1,000 | " |

*1 : Mercury-porosimeter: Calculated value with total pore volume (theoretical specific gravity of cordierite was assumed to be 2.52)
*2 : X-ray diffractometry: Measured value by using a ZnO internal standard
*3 : Tolerable temperature during the operation of (charging into an electric furnace) - (keeping for 30 minutes) - (taking out into room temperature environment)

It can be seen from the results shown in Table 2 that, in Sample Nos. 2-6, 9-14, 16, 18 and 19, wherein talc having an average particle size of 5-100 μm, alumina having an average particle size of not larger than 2 μm and high purity non-crystalline silica having an average particle size of not large than 15 μm were used, the resulting cordierite honeycomb-structural body has a low coefficient of thermal expansion in its axis A direction and in its axis B direction, as defined in the present invention.

Further, it can be seen from the results shown in Table 2 that, in Sample Nos. 1 and 7 using talc having a particle size outside the range defined in the present invention, in Sample No. 8 using alumina having a particle size outside the range defined in the present invention, in Sample No. 15 using silica having a particle size outside the range defined in the present invention, and in Sample No. 17 using quartz, cordierite honeycomb-structural bodies having a coefficient of thermal expansion either in their axis A direction or in their axis B direction, as defined in the present invention, are not obtained.

It can be seen from FIGS. 1 and 2 that the thermal shock resistance temperature of cordierite honeycomb-structural bodies varies in inverse proportion to its coefficient of thermal expansion, and this relation is remarkable between the coefficient of thermal expansion in the axis B direction and the thermal shock resistance temperature. It can be seen from FIG. 3 that, in spite of the fact that the talc used in the present invention has the same particle size as the talc used in Japanese Patent Application Publication No. 57-28,390, cordierite honeycomb-structural bodies having a very low thermal expansion can be obtained in the present invention due to the combined use of high-purity non-crystalline silica and finely divided alumina.

EXAMPLE 2

Raw materials having chemical analysis values and particle sizes shown in Table 1 were mixed according to the batch composition of Sample Nos. 20-54 shown in Table 3, and the resulting mixtures were kneaded together with a plasticizer to form extrusion-moldable batches.

Then, each batch was extruded into a cylindrical green honeycomb-structural body having a diameter of 93 mm and a height of 100 mm, which body had a wall thickness of 152 μm and had 62 cells per one square centimeter, each cell having a square cross-sectional shape. After the green honeycomb-structural body was dried, the body was fired at a firing temperature shown in Table 3 to produce a sintered honeycomb-structural body. As the properties of the sintered body, the coefficients of thermal expansion in the axis A direction and in the axis B direction, the porosity, the distribution of the diameters of pores, the amount of cordierite crystals and the thermal shock resistance were measured. The obtained results are shown in Table 3.

TABLE 3(a)-1

| Sample No. | Batch composition (wt %) | | | | | | Firing temperature (°C.) |
|---|---|---|---|---|---|---|---|
| | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | |
| 20 | 40.6 (18.0) | 14.4 (2.0) | 9.0 (2.0) | 10.5 (2.0) | 15.5 (1.2) | 10.0 (12.0) | 1,400 |
| 21 | 40.6 (15.0) | 14.4 (2.0) | 9.0 (2.0) | 10.5 (2.0) | 15.5 (1.2) | 10.0 (12.0) | 1,400 |
| 22 | 40.6 (12.0) | 14.4 (2.0) | 9.0 (2.0) | 10.5 (2.0) | 15.5 (1.2) | 10.0 (12.0) | 1,400 |
| 23 | 40.6 (7.0) | 14.4 (2.0) | 9.0 (2.0) | 10.5 (2.0) | 15.5 (1.2) | 10.0 (12.0) | 1,400 |
| 24 | 40.6 (5.0) | 14.4 (1.2) | 9.0 (2.0) | 10.5 (2.0) | 15.5 (1.2) | 10.0 (12.0) | 1,400 |
| 25 | 40.6 (3.2) | 14.4 (0.3) | 9.0 (1.2) | 10.5 (2.0) | 15.5 (1.2) | 10.0 (12.0) | 1,400 |
| 26 | 40.8 (12.0) | 15.0 (2.0) | 11.2 (2.0) | 12.4 (4.0) | 12.6 (1.2) | 8.0 (12.0) | 1,420 |
| 27 | 40.8 (12.0) | 15.0 (2.0) | 11.2 (2.0) | 12.4 (2.0) | 12.6 (1.2) | 8.0 (12.0) | 1,420 |
| 28 | 40.8 (12.0) | 15.0 (2.0) | 11.2 (2.0) | 12.4 (2.0)* | 12.6 (1.2) | 8.0 (12.0) | 1,420 |

TABLE 3(a)-2

| Sample No. | Batch composition (wt %) | | | | | | Fighest firing temperature (°C.) |
|---|---|---|---|---|---|---|---|
| | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | |
| 29 | 40.8 (12.0) | 15.0 (2.0) | 11.2 (2.0) | 12.4 (1.0) | 12.6 (1.2) | 8.0 (12.0) | 1,420 |
| 30 | 40.8 (12.0) | 15.0 (2.0) | 11.2 (2.0) | 12.4 (1.0)* | 12.6 (1.2) | 8.0 (12.0) | 1,420 |
| 31 | 40.8 (12.0) | 15.0 (0.3) | 11.2 (0.8) | 12.4 (1.0)* | 12.6 (1.2) | 8.0 (12.0) | 1,420 |
| 32 | 40.8 (12.0) | 15.0 (2.0) | 11.2 (2.0) | 12.4 (2.0)* | 12.6 (1.2) | 8.0 (9.1) | 1,420 |
| 33*A | 39.0 (7.0) | 15.0 (1.2) | 7.5 (2.0) | 12.0 (2.0)* | 14.5 (1.2) | 12.0 (18.5) | 1,430 |
| 34 | 39.0 (7.0) | 15.0 (1.2) | 7.5 (2.0) | 12.0 (2.0)* | 14.5 (1.2) | 12.0 (12.0) | 1,430 |
| 35 | 39.0 (7.0) | 15.0 (1.2) | 7.5 (2.0) | 12.0 (2.0)* | 14.5 (1.2) | 12.0 (12.0)** | 1,430 |
| 36 | 39.0 (7.0) | 15.0 (1.2) | 7.5 (2.0) | 12.0 (2.0)* | 14.5 (1.2) | 12.0 (9.1) | 1,430 |
| 37 | 39.0 (7.0) | 15.0 (1.2) | 7.5 (2.0) | 12.0 (2.0)* | 14.5 (1.2) | 12.0 (9.8)** | 1,430 |

TABLE 3(a)-3

| Sample No. | Batch composition (wt %) | | | | | | Firing temperature (°C.) |
|---|---|---|---|---|---|---|---|
| | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | |
| 38 | 39.0 (7.0) | 15.0 (1.2) | 7.5 (2.0) | 12.0 (2.0)* | 14.5 (1.2) | 12.0 (6.0) | 1,430 |
| 39 | 39.0 (7.0) | 15.0 (1.2) | 7.5 (2.0) | 12.0 (2.0)* | 14.5 (1.2) | 12.0 (2.0) | 1,430 |
| 40 | 39.0 (12.0) | 15.0 (1.2) | 7.5 (2.0) | 12.0 (2.0)* | 14.5 (1.2) | 12.0 (9.1) | 1,430 |
| 41 | 41.0 (12.0) | 20.0 (1.2) | 10.0 (2.0) | 11.0 (2.0) | 12.0 (1.2) | 6.0 (9.1) | 1,420 |
| 42 | 41.0 (12.0) | 20.0 (1.2) | 10.0 (0.8) | 11.0 (2.0)* | 12.0 (1.2) | 6.0 (9.1) | 1,420 |
| 43 | 39.5 (12.0) | 13.0 (1.2) | 4.0 (2.0) | 18.0 (2.0) | 10.5 (1.2) | 15.0 (9.1) | 1,420 |
| 44 | 39.5 (13.0) | 13.0 (1.2) | 4.0 (0.8) | 18.0 (2.0)* | 10.5 (1.2) | 15.0 (9.1) | 1,420 |
| 45 | 40.2 (12.0) | 6.8 (1.2) | 3.5 (2.0) | 18.0 (2.0) | 11.5 (1.2) | 20.0 (9.1) | 1,420 |
| 46 | 40.2 (12.0) | 6.8 (1.2) | 3.5 (0.8) | 18.0 (2.0)* | 11.5 (1.2) | 20.9 (9.1) | 1,420 |
| 47 | 40.5 (12.0) | 12.5 (3.8) | 8.5 (3.8) | 14.0 (1.0)* | 14.0 (1.2) | 10.5 (9.1) | 1,400 |
| 48 | 40.5 (12.0) | 12.5 (2.0) | 8.5 (2.0) | 14.0 (1.0)* | 14.0 (1.2) | 10.5 (9.1) | 1,400 |

TABLE 3(a)-4

| | Batch composition (wt %) | | | | | |
|---|---|---|---|---|---|---|
| Sample No. | Talc (average particle size: μm) | Kaolin (average particle size: μm) | Calcined kaolin (average particle size: μm) | Alumina (average particle size: μm) | Aluminum hydroxide (average particle size: μm) | Silica (average particle size: μm) | Firing temperature (°C.) |
| 49 | 40.5 (12.0) | 12.5 (1.2) | 8.5 (0.8) | 14.0 (1.0)* | 14.0 (1.2) | 10.5 (9.1) | 1,400 |
| 50 | 40.5 (12.0) | 12.5 (0.3) | 8.5 (0.8) | 14.0 (1.0)* | 14.0 (1.2) | 10.5 (9.1) | 1,400 |
| 51 | 40.3 (12.0) | 18.7 (2.0) | 10.0 (2.0) | 21.0 (2.0) | — | 10.0 (9.1) | 1,430 |
| 52 | 40.3 (12.0) | 18.7 (1.2) | 10.0 (2.0) | 21.0 (1.0)* | — | 10.0 (9.1) | 1,430 |
| 53 | 40.3 (12.0) | 18.7 (1.2) | 10.0 (0.8) | 21.0 (1.0)* | — | 10.0 (9.1) | 1,430 |
| 54 | 40.0 (12.0) | 25.0 (2.0) | 21.0 (2.0) | 14.0 (2.0) | — | — | 1,420 |

\* : Low-soda alumina
\*\* : Quartz
\*A : Same with Sample No. 15

TABLE 3(b)-1

| | Properties of sintered body | | | | | | | |
|---|---|---|---|---|---|---|---|---|
| Sample No. | Coefficient of thermal expansion in axis A direction ($\times 10^{-6}$/°C.) | Coefficient of thermal expansion in axis B direction ($\times 10^{-6}$/°C.) | *1 Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *2 Amount of cordierite crystals (wt %) | *3 Thermal shock resistance temperature (°C.) | Remarks |
| 20 | 0.2 | 0.4 | 35 | 37 | 34 | 93 | 1,050 | Present invention |
| 21 | 0.2 | 0.4 | 35 | 42 | 28 | 93 | 1,050 | " |
| 22 | 0.2 | 0.4 | 35 | 45 | 24 | 93 | 1,050 | " |
| 23 | 0.2 | 0.4 | 33 | 50 | 19 | 92 | 950 | " |
| 24 | 0.3 | 0.5 | 33 | 52 | 17 | 92 | 950 | " |
| 25 | 0.5 | 0.6 | 30 | 54 | 15 | 92 | 900 | Comparative sample (talc: fine) |
| 26 | 0.5 | 0.7 | 35 | 41 | 28 | 91 | 850 | Comparative sample (alumina: coarse) |
| 27 | 0.3 | 0.5 | 34 | 45 | 23 | 91 | 950 | Present invention |
| 28 | 0.2 | 0.3 | 33 | 51 | 20 | 93 | 1,050 | " |

TABLE 3(b)-2

| | Properties of sintered body | | | | | | | |
|---|---|---|---|---|---|---|---|---|
| Sample No. | Coefficient of thermal expansion in axis A direction ($\times 10^{-6}$/°C.) | Coefficient of thermal expansion in axis B direction ($\times 10^{-6}$/°C.) | *1 Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *2 Amount of cordierite crystals (wt %) | *3 Thermal shock resistance temperature (°C.) | Remarks |
| 29 | 0.2 | 0.3 | 32 | 49 | 20 | 92 | 1,050 | Present invention |
| 30 | 0.1 | 0.3 | 31 | 52 | 20 | 93 | 1,100 | " |
| 31 | 0.1 | 0.3 | 31 | 54 | 15 | 93 | 1,100 | " |
| 32 | 0.1 | 0.3 | 33 | 51 | 18 | 92 | 1,050 | " |
| 33*A | 0.2 | 0.6 | 43 | 38 | 33 | 90 | 900 | Comparative sample (silica: coarse) |
| 34 | 0.2 | 0.3 | 37 | 51 | 18 | 92 | 1,050 | Present invention |
| 35 | 0.5 | 0.8 | 42 | 47 | 23 | 89 | 850 | Comparative sample (quartz) |
| 36 | 0.2 | 0.3 | 37 | 55 | 15 | 92 | 1,050 | Present invention |
| 37 | 0.4 | 0.6 | 43 | 48 | 21 | 88 | 900 | Comparative sample (quartz) |

TABLE 3(b)-3

Properties of sintered body

| Sample No. | Coefficient of thermal expansion in axis A direction ($\times 10^{-6}/°C$) | Coefficient of thermal expansion in axis B direction ($\times 10^{-6}/°C$) | *1 Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *2 Amount of cordierite crystals (wt %) | *3 Thermal shock resistance temperature (°C) | Remarks |
|---|---|---|---|---|---|---|---|---|
| 38 | 0.3 | 0.4 | 33 | 57 | 12 | 91 | 1,000 | Present invention |
| 39 | 0.3 | 0.4 | 31 | 59 | 11 | 93 | 1,000 | " |
| 40 | 0.2 | 0.3 | 38 | 53 | 18 | 91 | 1,050 | " |
| 41 | 0.3 | 0.5 | 32 | 46 | 22 | 91 | 950 | " |
| 42 | 0.3 | 0.4 | 31 | 54 | 14 | 90 | 1,000 | " |
| 43 | 0.2 | 0.5 | 39 | 47 | 25 | 90 | 950 | " |
| 44 | 0.2 | 0.4 | 37 | 52 | 17 | 91 | 1,000 | " |
| 45 | 0.3 | 0.5 | 40 | 41 | 30 | 91 | 900 | " |
| 46 | 0.2 | 0.5 | 39 | 43 | 26 | 92 | 950 | " |
| 47 | 0.3 | 0.5 | 37 | 47 | 24 | 93 | 950 | " |
| 48 | 0.2 | 0.3 | 36 | 53 | 17 | 92 | 1,050 | " |

TABLE 3(b)-4

Properties of sintered body

| Sample No. | Coefficient of thermal expansion in axis A direction ($\times 10^{-6}/°C$) | Coefficient of thermal expansion in axis B direction ($\times 10^{-6}/°C$) | *1 Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *2 Amount of cordierite crystals (wt %) | *3 Thermal shock resistance temperature (°C) | Remarks |
|---|---|---|---|---|---|---|---|---|
| 49 | 0.1 | 0.3 | 35 | 56 | 13 | 92 | 1,050 | Present invention |
| 50 | 0.0 | 0.3 | 34 | 59 | 12 | 92 | 1,100 | " |
| 51 | 0.3 | 0.4 | 34 | 46 | 23 | 91 | 950 | " |
| 52 | 0.2 | 0.4 | 32 | 52 | 17 | 92 | 1,000 | " |
| 53 | 0.2 | 0.4 | 31 | 54 | 15 | 92 | 1,000 | " |
| 54 | 0.6 | 0.8 | 34 | 50 | 20 | 88 | 800 | Comparative sample |

*1: Mercury-porosimater: Calculated value with total pore volume (theoretical specific gravity of cordierite was assumed to be 2.52)
*2: X-ray diffractiometry: Measured value by using a ZnO internal standard
*3: Tolerable temperature during the operation of (charging into an electric furnace) - (keeping for 30 minutes) - (taking out into room temperature environment)
*A: Same with Sample No. 15

EXAMPLE 3

The coatability of the cordierite honeycomb-structural body of the present invention was examined in the following manner. A mixture of 70% by weight of γ-alumina consisting of a high-specific surface area material, 25% by weight of ceria powder and 5% by weight of alumina sol was mixed with diluted nitric acid as a pH adjusting agent to produce 20 l of a coating slurry having a solids content of 25%. Cordierite honeycomb-structural bodies of the sample numbers shown in the following 4 were used among the cordierite honeycomb-structural bodies produced in Example 2, and each of the bodies was dipped in the above obtained slurry for 3 minutes, taken out of the slurry, placed in an air stream to flow any remaining slurry, and then dried. The steps from the dipping into slurry to the drying were repeated 3 times, and then the thus treated honeycomb-structural body was fired at 650° C.

The fired honeycomb-structural body was weighed, and the loaded amount of the coating material on the honeycomb-structural body by the 3 times of dipping was measured. Further, the thermal shock resistance temperature of the cordierite honeycomb-structural body after coating was measured. The obtained results are shown in Table 4.

TABLE 4

| Sample No. | Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *1 Loading amount (wt %) | *2 Thermal shock resistance temperature of honeycomb structural body after loading (°C) | Remarks |
|---|---|---|---|---|---|---|
| 20 | 35 | 37 | 34 | 17.5 | 650 | Present invention |
| 22 | 35 | 45 | 24 | 19.1 | 750 | " |
| 24 | 33 | 52 | 17 | 20.4 | 700 | " |
| 25 | 30 | 54 | 15 | 20.9 | 650 | Comparative sample |
| 27 | 34 | 45 | 23 | 19.0 | 750 | Present invention |

TABLE 4-continued

| Sample No. | Porosity (%) | Ratio in percentage of total volume of pores having a diameter of 0.5~5 μm to total pore volume (%) | Ratio in percentage of total volume of pores having a diameter of not smaller than 10 μm to total pore volume (%) | *1 Loading amount (wt %) | *2 Thermal shock resistance temperature of honeycomb structural body after loading (°C.) | Remarks |
| --- | --- | --- | --- | --- | --- | --- |
| 29 | 32 | 49 | 20 | 19.6 | 800 | " |
| 33 | 43 | 38 | 33 | 17.8 | 600 | Comparative sample |
| 36 | 37 | 55 | 15 | 21.3 | 800 | Present invention |
| 39 | 31 | 59 | 11 | 21.7 | 750 | " |
| 41 | 32 | 46 | 22 | 18.9 | 700 | " |
| 45 | 40 | 41 | 30 | 18.0 | 700 | " |
| 47 | 37 | 47 | 24 | 19.2 | 700 | " |
| 50 | 34 | 59 | 12 | 22.1 | 800 | " |

*1: Ratio in percentage of (weight of loading materials on a fired honeycomb structural body)/(weight of the honeycomb structural body)
*2: Tolerable temperature during the operation of (charging into an electric furnace) - (keeping for 30 minutes) - (taking out into a room temperature environment)

The obtained results shown in Table 4 are further illustrated in FIGS. 5-8.

FIG. 5 illustrates a relation between the ratio in percentage of the total volume of pores having a diameter of 0.5-5 μm to the total pore volume in the honeycomb-structural body and the loading amount of the coating material on the body. FIG. 6 illustrates a relation between the ratio in percentage of the total volume of pores having a diameter of not smaller than 10 μm to the total pore volume in the honeycomb-structural body and the loading amount of the coating material on the body. FIG. 7 illustrates a relation between the coefficient of thermal expansion of the honeycomb-structural body in its axis A direction and the thermal shock resistance temperature of the body. FIG. 8 illustrates a relation between the coefficient of thermal expansion of the honeycomb-structural body in its axis B direction and the thermal shock resistance temperature of the body.

It can be seen from the results of the above described experiment that the cordierite honeycomb-structural bodies of Sample Nos. 20-24, 27-32, 34, 36 and 38-53, which have a coefficient of thermal expansion within the range defined in the present invention, are equal to or higher than the cordierite honeycomb-structural bodies of Sample Nos. 25, 27, 33 and 37, which have a coefficient of thermal expansion outside the range defined in the present invention, in the thermal shock resistance temperature, and have excellent thermal shock resistance.

Further, it can be seen from Table 4, which shows a relation between the distribution of the diameters of the pores in the honeycomb-structural body and the loading amount of the coating material on the body or the thermal shock resistance of the body in the coated state, that cordierite honeycomb-structural bodies, wherein the total volume of pores having a diameter of 0.5-5 μm is not less than 40% based on the total pore volume and the total volume of pores having a diameter of not smaller than 10 μm is not more than 30% based on the total pore volume, has excellent coatability and has a high thermal shock resistance temperature after coating.

EXAMPLE 4

Cordierite honeycomb-structural bodies of the sample numbers shown in the following Table 5 among the cordierite honeycomb-structural bodies shown in Table 3 were prepared in the same manner as described in Example 2, and the major axis of the smallest domain, the average length of cordierite crystals, the amount ratio in percentage of crystals having an aspect ratio of at least 1.5, and the I ratio [I(110)/{I(110)+I(002)}] of the cordierite crystal on the honeycomb wall surface (on a plane parallel to the extrusion direction of the honeycomb-structural body) of each sample were measured. The obtained results are shown in Table 5.

In Table 5, the major axis of the smallest domain was measured from the major axis of the smallest domain, which can be identified from the SEM photograph of each sample. The length of cordierite crystal and the amount ratio in percentage of crystals having an aspect ratio of at least 1.5 were measured by a method wherein cordierite crystals were randomly selected from the cordierite crystals in the SEM photograph of each sample, and the length and width of the crystal were measured, and further the aspect ratio was calculated.

TABLE 5

| Sample No. | Major axis of the smallest domain (μm) | Average length of cordierite crystals (μm) | Amount ratio in percentage of crystals having an aspect ratio of at least 1.5 (%) | I ratio of honeycomb wall surface $\frac{I(110)}{I(110) + I(002)}$ |
| --- | --- | --- | --- | --- |
| 22 (Present invention) | 30 | 2.0 | 85 | 0.82 |
| 24 " | 20 | 1.0 | 80 | 0.78 |
| 26 (Comparative sample) | 10*3 | 0.7 | 60 | 0.74 |
| 30 " | 30 | 3.0 | 90 | 0.84 |
| 32 " | 30 | 2.5 | 85 | 0.86 |
| 35 (Comparative sample) | 10*3 | 0.8 | 50 | 0.74 |
| 38 (Present invention) | 30 | 1.5 | 85 | 0.80 |
| 44 " | 20 | 3.0 | 90 | 0.86 |
| 48 " | 30 | 4.0 | 85 | 0.86 |
| 50 " | 20 | 3.5 | 85 | 0.88 |

TABLE 5-continued

| Sample No. | Major axis of the smallest domain (μm) | Average length of cordierite crystals (μm) | Amount ratio in percentage of crystals having an aspect ratio of at least 1.5 (%) | I ratio of honeycomb wall surface $\frac{I(110)}{I(110) + I(002)}$ |
|---|---|---|---|---|
| 54 (Comparative sample) | 10*3 | 0.8 | 30 | 0.72 |

*3 Cordierite idiomorphic crystal is unclear in many portions, and few domains can be identified.

It can be seen from the results shown in Table 5 that, in substantially all of the cordierite honeycomb-structural bodies of the present invention, the major axis of the smallest domain is not less than 20 μm, the average length of cordierite crystals is 1–5 μm and the amount ratio in percentage of crystals having an aspect ratio of at least 1.5 is not less than 80%, and these ranges are preferable ranges in the present invention. Further, it has been found that the I ratio of the honeycomb wall surface is preferably within the range of at least 0.78.

FIGS. 9a and 9b are SEM photographs of 50 magnifications and 2,000 magnifications, respectively, of the cordierite honeycomb-structural body of Sample No. 50 (present invention), and FIGS. 10a and 10b are SEM photographs of 50 magnifications and 2,000 magnifications, respectively, of the cordierite honeycomb-structural body of Sample No. 54 (comparative sample). FIG. 11 is a schematic view for explaining various regions in the SEM photograph shown in FIG. 9a.

It can be seen from FIGS. 9a, 9b and 11 that, in the cordierite honeycomb-structural body of Sample No. 50 of the present invention, long column-like cordierite idiomorphic crystals, which extend in the crystallographic axis c direction and have an average length of 3.5 μm, are predominantly developed to form domains having a major axis of not less than 20 μm. Further, it can be seen that crystals having an aspect ratio of at least 1.5 occupy 85% of whole crystals and many micro-cracks are extending along the crystallographic axis c direction of crystals in the domain. Large domain has a major axis of not less than 100 μm and is difficult to be identified by the SEM photograph.

On the contrary, in the cordierite honeycomb structural body (comparative sample) of Sample No. 54 shown in the SEM photographs of FIG. 10a and 10b, the presence of cordierite idiomorphic crystals is not observed in almost the entire portion of the photographs, and the average length of the idiomorphic crystals is small, e.g., about 0.8 μm. Accordingly, only relatively small domains (major axis: not less than 10μ) are observed in only a part of the photographs. Although the photograph of 2,000 magnifications shown in FIG. 10b indicates a portion, wherein the idiomorphic crystal is developed in a relatively large amount, the amount of crystals having an aspect ratio of at least 1.5 is small, and is only 30% as a whole. Although micro-cracks are observed in the photograph of FIG. 10b, the relation of the micro-cracks and the cordierite crystal is not clear.

FIGS. 12a and 12b are SEM photographs of the cordierite honeycomb-structural body of Sample No. 50 (present invention) at room temperature and at 800° C., respectively, in the same visual field. It can be ascertained from the comparison of FIG. 12a with FIG. 12b that micro-cracks opened at room temperature are substantially completely closed at 800° C. This shows that the presence of micro-cracks contributes to the production of low-thermal expansion cordierite honeycomb-structural bodies.

FIG. 13 illustrates the thermal expansion hysteresis curves up to 1,200° C. of cordierite honeycomb-structural bodies of Sample No. 50 (present invention) and No. 54 (comparative sample). It can be seen from FIG. 13 that the maximum amount of hysteresis (maximum amount of the difference between the thermal expansion at the same temperature of the cordierite honeycomb-structural body in the expansion curve during the heating and in the shrinking curve during the cooling) of the body of Sample No. 50 is 0.086%, and the maximum amount of hysteresis of the body of Sample No. 54 is 0.068%. It is thought that the maximum amount of hysteresis indicates the amount of micro-cracks and the effect for the production of a low-thermal expansion cordierite honeycomb-structural body. Since there is no significant difference in the amount of micro-cracks in the observation of microstructure between the body of Sample No. 50 and the body of Sample No. 54, the effect of micro-cracks for the production of low-thermal expansion cordierite honeycomb-structural body is higher in the body of Sample No. 50 than in the body of Sample No. 54.

As described above, according to the present invention, a cordierite honeycomb structural body having excellent heat resistance and thermal shock resistance, which body has a porosity of higher than 30% but not higher than 42% and coefficients of thermal expansion of not higher than $0.3 \times 10^{-6}/°C$. in its axis A direction and of not higher than $0.5 \times 10^{-6}/°C$. in its axis B direction within the temperature range of 40°–800° C., can be obtained. Moreover, when the distribution of the diameters of pores in the above described cordierite honeycomb-structural body is property limited, there can be obtained a cordierite honeycomb-structural body to be used as a catalyst carrier, which has improved shock resistance and coatability with a high specific surface area material and a catalyst, and is small in the deterioration of the thermal shock resistance after coating, said deterioration being caused by the coating with the high specific surface area material and the catalyst, which have a higher thermal expansion than that of the cordierite carrier. Therefore, the cordierite honeycomb structural body is very useful as a ceramic carrier for supporting catalyst, which is required to have particularly high heat resistance and thermal shock resistance and is used in an increasing amount corresponding to the manifolding of the purification apparatus for exhaust gas of automobile and to the high speed running of automobile.

What is claimed is:

1. A cordierite honeycomb-structural body to be used as a catalyst carrier, comprising: a composition consisting mainly of 42-56% by weight of $SiO_2$, 30-45% by weight of $Al_2O_3$ and 12-16% by weight of MgO; a crystal phase consisting mainly of cordierite; a porosity of greater than 30% and not greater than 42%; a coefficient of thermal expansion of not greater than $0.3 \times 10^{-6}/°C$. within a temperature range of 40°–800°

C. in a flow-passage direction of the honeycomb structural body; and a coefficient of thermal expansion of not greater than $0.5 \times 10^{-6}/°C$. within a temperature range of 40°-800° C. in a direction perpendicular to the flow-passage of the honeycomb structural body.

2. A cordierite honeycomb-structural body according to claim 1, wherein the coefficient of thermal expansion within the temperature range of 40°-800° C. in the flow-passage direction of the honeycomb structural body is not greater than $0.2 \times 10^{-6}/°C$.

3. A cordierite honeycomb-structural body according to claim 1, wherein a total volume of pores having a diameter of 0.5-5 μm is not less than 40% based on the total pore volume of the body and a total volume of pores having a diameter of not smaller than 10 μm is not greater than 30% based on the total pore volume of the body.

4. A cordierite honeycomb-structural body according to claim 1, wherein a total volume of pores having a diameter of 0.5-5 μm is not less than 50% based on the total pore volume of the body and a total volume of pores having a diameter of not smaller than 10 μm is not greater than 20% based on the total pore volume of the body.

5. A cordierite honeycomb-structural body according to claim 1, wherein the average length of the cordierite crystals in the crystallographic axis c direction is 1-5 μm and at least 80% of the cordierite crystals have an aspect ratio of at least 1.5.

6. A cordierite honeycomb-structural body according to claim 1, wherein the cordierite crystal has an I ratio of at least 0.78 on a honeycomb wall surface, said surface being on a plane parallel to an extrusion direction of the honeycomb-structural body.

7. A method for producing a cordierite honeycomb-structural body to be used as a catalyst carrier, comprising:

mixing starting materials comprising talc having an average particle size of 5-100 μm, alumina having an average particle size of not greater than 2 μm, high-purity non-crystalline silica having an average particle size of not greater than 15 μm and other cordierite-forming materials to form a mixture consisting mainly of 42-56% by weight of $SiO_2$, 30-45% by weight of $Al_2O_3$ and 12-16% by weight of MgO calculated as oxides;

kneading the mixture together with a plasticizer and an organic binder to form an extrudably plasticized batch;

extruding the plasticized batch into a shaped article having a honeycomb structure by an extrusion-molding method;

drying the shaped article; and firing the dried, shaped article at a temperature of 1,350°-1,440° C.

8. A method according to claim 7, wherein said alumina has an $Na_2O$ content of not greater than 0.12% by weight.

9. A method according to claim 7, wherein said other cordierite-forming materials comprise kaolin having an average particle size of not greater than 2 μm.

10. A method according to claim 7, wherein said talc has an average particle size of 7-50 μm.

11. A method according to claim 7, wherein the starting material mixture contains 8-20% by weight of the high-purity non-crystalline silica.

12. A method according to claim 7, wherein said talc has an average particle size of 5-15 μm and said high-purity non-crystalline silica has an average particle size of not greater than 12 μm.

13. A method according to claim 12, wherein said talc has an average particle size of 7-12 μm.

14. A method according to claim 12, wherein said high-purity non-crystalline silica has an average particle size of not larger than 8 μm.

* * * * *